US011361761B2

(12) United States Patent
Boxwell et al.

(10) Patent No.: US 11,361,761 B2
(45) Date of Patent: Jun. 14, 2022

(54) PATTERN-BASED STATEMENT ATTRIBUTION

(71) Applicant: International Business Machines Corporation, Armonk, NY (US)

(72) Inventors: Stephen Arthur Boxwell, Franklin, OH (US); Keith Gregory Frost, Delaware, OH (US); Kyle Matthew Brake, Westerville, OH (US); Stanley John Vernier, Grove City, OH (US)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 16/654,330

(22) Filed: Oct. 16, 2019

(65) Prior Publication Data

US 2021/0118434 A1 Apr. 22, 2021

(51) Int. Cl.
| | | |
|---|---|---|
| *G10L 15/00* | (2013.01) | |
| *G10L 15/19* | (2013.01) | |
| *G06F 16/33* | (2019.01) | |
| *G10L 15/30* | (2013.01) | |
| *G10L 15/02* | (2006.01) | |
| *G10L 15/22* | (2006.01) | |
| *G10L 15/06* | (2013.01) | |
| *G10L 15/187* | (2013.01) | |

(52) U.S. Cl.
CPC .......... *G10L 15/19* (2013.01); *G06F 16/3346* (2019.01); *G10L 15/02* (2013.01); *G10L 15/22* (2013.01); *G10L 15/30* (2013.01); *G10L 15/063* (2013.01); *G10L 15/187* (2013.01); *G10L 2015/0631* (2013.01)

(58) Field of Classification Search
CPC combination set(s) only.
See application file for complete search history.

(56) References Cited

U.S. PATENT DOCUMENTS

| | | | |
|---|---|---|---|
| 9,282,090 B2 | 3/2016 | Liberman et al. | |
| 9,323,721 B1 | 4/2016 | Banerjee et al. | |
| 10,573,312 B1* | 2/2020 | Thomson | G10L 15/187 |
| 2006/0248076 A1 | 11/2006 | Troy et al. | |
| 2009/0034803 A1 | 2/2009 | Matos | |
| 2009/0265304 A1 | 10/2009 | Ait-Mokhtar et al. | |
| 2017/0069327 A1* | 3/2017 | Heigold | G10L 17/18 |
| 2018/0018987 A1* | 1/2018 | Zass | H04R 1/265 |

(Continued)

OTHER PUBLICATIONS

Anonymous, "System and Method to Classify Account Types of Social Media Authors," An IP.com Prior Art Database Technical Disclosure, IP.com No. IPCOM000248589D, Dec. 20, 2016, 5 pages. https://ip.com/IPCOM/000248589.

(Continued)

*Primary Examiner* — Vu B Hang
(74) *Attorney, Agent, or Firm* — Kelsey M. Skodje

(57) ABSTRACT

A system, method, and computer program product for determining statement attributions. The system includes at least one processing component, at least one memory component, a feature extractor, a model generator, a model database, and an attribution selector. The method includes receiving a statement, generating at least one pattern that defines a grammatical feature of the statement, and generating a statement model from the at least one pattern. The method also includes determining a similarity value for the statement model and at least one reference model.

20 Claims, 5 Drawing Sheets

(56) References Cited

U.S. PATENT DOCUMENTS

2018/0090141 A1* 3/2018 Periorellis ............ G10L 15/1815
2018/0308501 A1* 10/2018 Johnson .................. G10L 17/06
2018/0314755 A1 11/2018 Curin
2018/0359280 A1 12/2018 Elworthy

OTHER PUBLICATIONS

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

PATTERN-BASED STATEMENT ATTRIBUTION

BACKGROUND

The present disclosure relates to determining statement attributions and, more specifically, to determining statement attributions based on grammatical feature patterns.

Statements include written and spoken information. In many cases, the original source (e.g., an individual) of a statement can be unknown. Additionally, statements can be misattributed to sources other than the original. For example, a statement posted via a user profile on a social networking platform can be attributed to the individual associated with the profile. In another example, it can be determined that a statement was uttered by another individual prior to its utterance by an initially attributed individual. Statement attribution can also include comparing features of the statement (e.g., language, word choice, topic, context, etc.) to other statements from known individuals.

SUMMARY

Various embodiments are directed to a system that includes at least one processing component and at least one memory component. The system also includes a feature extractor configured receive a statement and to generate at least one pattern (e.g., a language-dependent pattern) that defines a grammatical feature of the statement, a model generator configured to generate a statement model from the at least one pattern, a model database that includes at least one reference model associated with a source, and an attribution selector configured to determine a similarity value for the statement model and the at least one reference model. Each reference model can be based on an existing statement uttered by an associated source. In some embodiments, the model database includes two or more reference models having associated sources. In these instances, the attribution selector can identify an associated source with the highest probability of being a source of the statement, and generate an output that displays this attribution. The statement can have an initial attribution to a known source. The attribution selector can determine a similarity value for the statement model and a reference model associated with the known source, determine that the value is above a threshold value, and generate an output indicating that the initial attribution is correct. The attribution selector can also determine that a similarity value for the statement model and a reference model associated with the known source is below a threshold value, and generate an output indicating that the initial attribution is incorrect.

Further embodiments are directed to a method that includes receiving a statement, generating at least one pattern that defines a grammatical feature of the statement, and generating a statement model from the at least one pattern (e.g., a language-independent pattern). The method also includes determining a similarity value for the statement model and at least one reference model. Each reference model can be based on an existing statement uttered by an associated source, and the method can include determining similarity values for the statement model and two or more reference models. Additionally, the method can include identifying an associated source having the greatest probability of being the source of the statement, attributing the statement to this source, and generating an output that displays the attribution. In some embodiments, the statement has an initial attribution to a known source. A similarity value can be determined for the statement model and a reference model associated with the known source. If the similarity value is above a threshold similarity value, an output indicating that the initial attribution is correct can be generated. If the similarity value is below a threshold similarity value, an output indicating that the initial attribution is incorrect can be generated.

Additional embodiments are directed to a computer program product for determining attributions. The computer program produce includes a computer readable storage medium having program instructions that are executable by a processor to cause the device to perform a method. The method includes receiving a statement, generating at least one pattern that defines a grammatical feature of the statement, and generating a statement model from the at least one pattern. The method also includes determining a similarity value for the statement model and at least one reference model. The pattern can be language-independent.

DETAILED DESCRIPTION

Statements (e.g., written or spoken information, utterances, etc.) made by individuals can often be repeated by sources other than the originating individual. Further, statements can be intentionally or unintentionally misattributed. Statements can also be repeated by secondary sources that do not provide statement attributions. When there is uncertainty as to the original source of a statement, techniques for identifying and/or correcting misattributions can be employed. For example, statement attribution can include comparing language-based or semantic features of a statement (e.g., language, vocabulary, topics, keywords, etc.) to features of existing statements made by known individuals. However, language-dependent features such as these can be easily imitated and misidentified.

Disclosed herein are techniques for determining statement attributions based on language-independent features such as grammar-based language patterns. These patterns can define features in a statement such as parts of speech, sentence/phrase structures, verb alternations, etc., and are not dependent upon specific vocabularies or languages. However, the frequency with which different types of grammar-based patterns are used varies considerably between different individuals. Therefore, these patterns can be used to generate models for statements. A model generated based on a statement without a confirmed attribution can be compared to one or more reference models, which are based on existing statements from known sources. If a reference model is found to match the statement model, the statement can be attributed to the known source associated with this reference model.

Figure 1:
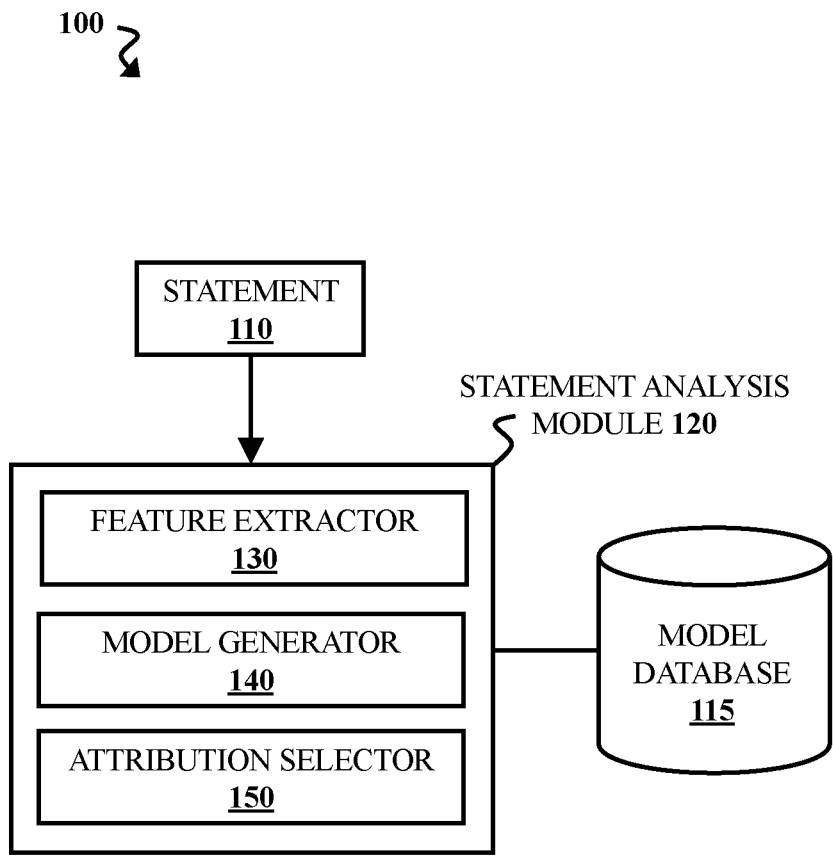
FIG. 1 is a block diagram illustrating an attribution analysis environment, according to some embodiments of the present disclosure.

FIG. 1 is a block diagram illustrating an attribution analysis environment 100, according to some embodiments of the present disclosure. The attribution analysis environment 100 includes a statement 110 in the form of computer-readable text, a model database 115, a statement analysis module 120. The statement analysis module 120 includes the following components: a feature extractor 130, a model generator 140, and an attribution selector 150. In embodiments, the feature extractor 130, model generator 140, and attribution selector 150 can be processor executable instructions that can be executed by a dedicated or shared processor using received inputs.

The statement 110 can be any type of utterance (e.g., one or more words, phrases, sentences, sounds, etc.). In some embodiments, the statement 110 is a portion of text data that includes at least two words. The statement 110 can be initially attributed to a source, or the source of the statement 110 can be unknown. Herein, "source" refers to an individual who originally uttered the statement (e.g., in writing or in speech). An initial attribution can correctly or incorrectly identify the source of the statement 110.

In some embodiments, the statement 110 includes at least one sentence. The statement 110 can be text from a source such as a book, article, blog or micro-blog post, press release, transcript, etc. The statement 110 can also be in the form of machine-encoded text extracted from audio data by a speech-to-text engine (e.g., using artificial neural networks, convolutional neural networks, statistical modeling, Hidden Markov Models (HMMs), lattice-based analysis, entropy-based speech segmentation algorithms, CMUS-phinx, etc.). Further, the statement 110 can be in the form of text obtained by converting characters detected in video frames or other graphical images to machine-encoded text (e.g., via optical character recognition (OCR) or intelligent character recognition (ICR)).

The feature extractor 130 parses the statement 110 in order to generate natural language patterns (e.g., dependency trees). The feature extractor 130 can also parse previous statements uttered by known individuals in order to generate patterns for these statements. Known individuals are individuals to whom a statement is considered to have been correctly attributed. For example, the existing statements can have been extracted from posts on a verified micro-blogging account, an audio or audiovisual recording of an identified individual (e.g., via a provided name, vocal and/or facial recognition, etc.), a publication authored by a known individual, a book or article written about a known individual (e.g., a biography or a textbook entry), etc. In some embodiments, existing statements and their sources can be manually identified.

The feature extractor 130 can use any appropriate parser for grammatical analysis to generate patterns from the statement 110 and existing statements. For example, Slot Grammar (SG) parsers can be used. The patterns can be syntax-based. For example, the patterns can define relationships between tokens (e.g., syntactic relationships such as subject (subj) or noun-adjective (nadj)). Features that can be defined by the patterns can include parts of speech, noun-phrase constructs, prepositional phrases, verb-phrase structures, verb alternations (e.g., impersonal, transitive, ditransitive, or tritransitive), independent and dependent clauses, sentence length, sentence complexity, active or passive voice, relative or complement clauses, etc.

In one example, the statement 110 can be a sentence such as, "This is the best restaurant in town," which identifies the existence of a superlative adjective ("best") modifying the object ("restaurant") of the verb ("is"). This can be expressed as a pattern such as the following:

```
pattern sup2{
    node be{
        link "pred" head;
    }
    node head{
        feat "feat" "erest";
    }
}
```

In another example, the statement 110 can include a phrase such as, "France's capital," which identifies the presence of a pre-noun genitive, as opposed to a post-noun genitive such as in the phrase "capital of France". In this example, the pattern can be:

```
pattern nmMod3{
    node head{
        feat "feat" "noun";
        link "ndet" mod;
    }
    node mod{
        feat "feat" "noun";
        link "nposs" apost;
    }
    node apost{
        feat "feat" "possmk";
    }
}
```

In another example, the statement 110 can include capital letters in non-standard locations (e.g., locations other than the first letter of a proper noun, a word at the beginning of a sentence, a word in a title, etc.). For example, the statement 110 can contain one or more words written in all capital letters (e.g., "Today is a GREAT day"). Based on this, the pattern can be:

```
pattern oneCappedWord{
    node head{
        feat "feat" "capped";
    }
}
```

The patterns can be language-independent. That is, the patterns can be based only on grammatical features (e.g., parts of speech, sentence/phrase structures, verb alternations, etc.), and are not dependent upon specific vocabularies or languages (e.g., semantic and/or lexical features). For example, the following sentences can be defined by three different patterns despite conveying substantially the same information: "Anne built this house," (pattern 1: active voice), "Anne BUILT this house," (pattern 2: one word in all capital letters), and "This house was built by Anne," (pattern 3: passive voice). These three patterns can also define phrases having different content but similar structure. For example, pattern 1 can also define the sentence "Josh sang Schubert's Winterreise," pattern 2 can define the sentence "JOSH sang Schubert's Winterreise," and pattern 3 can define the sentence "Schubert's Winterreise was sung by Josh."

However, it should be noted that in other embodiments the feature extractor 130 can extract supplementary semantic and/or lexical features as well. For example, English Slot Grammar (ESG) parsing can be followed by application of a predicate-argument structure (PAS) builder. In another example, the statement 110 can be searched for keywords associated with possible sources of the statement 110. Additionally, in some embodiments the feature extractor 130 can extract features such as punctuation (e.g., apostrophes, quotation marks, parentheses, commas, semi-colons, dashes, ellipses, etc.) and/or other characters (e.g., asterisks, hash symbols, numbers, etc.). When the statement 110 contains more than one sentence/phrase, the feature extractor 130 can extract information such as number of sentences, length and/or complexity of each sentence, number of paragraphs, length of each paragraph, presence of sections or lists, etc.

The model generator 140 generates a model for the statement 110 based on the patterns determined by the feature extractor 130. The model generator 140 can also generate reference models based on patterns from previous statements with known sources. These models can be added to the model database 115. However, the reference models can also be from a set of preexisting models in the model database 115. In some embodiments, the model generator 140 generates models based on the patterns alone. However, in other embodiments the models are also based on other features extracted by the feature extractor 130. Examples of additional features such as these are discussed in greater detail above.

For example, the model database 115 can contain a model for Individual A ("Model A"), a model for Individual B ("Model B"), and a model for Individual C ("Model C"). However, one or more reference models can also be generated and added to the model database 115 in response to user-input instructions. For example, a user can input a statement 110 and a potential source of the statement 110, such as Individual A. The feature generator 130 can then locate previous statements uttered by Individual A, and extract features from the previous statements to generate patterns. The model generator 140 can then generate Model A based on these patterns and, optionally, other features.

The attribution selector 150 compares the model generated for the statement 110 ("statement 110 model") to one or more reference models in order to determine whether at least one reference model matches the statement 110 model. The models are determined to match based on similarity values. For example, the similarity between the statement 110 model and a reference model can be determined by a distance metric (e.g., Squared Difference Sum). In some embodiments, the statement 110 has been initially attributed to a particular individual prior to analysis by the statement analysis module 120. The initial attribution can be entered by a user, or it can be determined automatically by the feature extractor 130. For example, the feature extractor 130 can locate text indicating that the statement 110 was uttered by a particular individual. The feature extractor 130 can also determine an initial attribution based on a location or possible source of the statement 110 (e.g., an unverified social networking profile, a personal website address, etc.). In the preceding example, if the statement 110 is from a blog entry that attributes the statement 110 to Individual A, the statement can initially be attributed to Individual A.

The attribution selector 150 can determine whether an initial attribution is correct. For example, the attribution selector 150 can compare the statement 110 model to a reference model associated with the initial attribution (e.g., a model based on grammatical features of previous statements uttered by the individual to whom the statement 110 was initially attributed). If the reference model matches the statement 110 model (e.g., has a similarity value above a threshold similarity value), it can be determined that the initial attribution is correct. The model database 115 can also be updated so that reference model can further define the statement 110 model. This is discussed in greater detail with respect to FIG. 2.

The attribution selector 150 can also determine a probability of the initial attribution being correct. There can be a threshold probability below which the statement 110 is not attributed to a source. For example, if the probability of Individual A having uttered the statement is not above this threshold, the statement 110 can be identified has having been misattributed. The attribution selector 150 can optionally compare the statement 110 model to additional models (e.g., Models B and/or C) upon determining that Individual A is not a likely source of the statement 110. This can allow a more accurate attribution to be made.

In some embodiments, the statement 110 does not have an initial attribution. The attribution selector 150 can instead locate potential sources associated with additional reference models in the model database 115. For example, the attribution selector 150 can determine the similarity between the statement 110 model and at least two reference models. The attribution selector 150 can then rank the reference models based on their similarity to the statement 110 model. The attribution selector 150 can also normalize the model confidences in order to simulate a probability distribution over the existing models, and rank the reference models based on their probability of being the source of the statement 110. Referring again to the example involving Individuals A, B, and C, if the statement 110 model is more similar to Model B than Models A and C, Individual B can be assigned the highest probability of having uttered the statement 110.

The attribution selector 150 can also compare the probabilities to a threshold probability (e.g., 85%, 90%, 95%, etc.) in order to determine an attribution for the statement 110. The threshold can also be a degree of similarity between the statement 110 model and each reference model. In some embodiments, the statement 110 is attributed to a source only if the probability associated with the reference model for the source is above the probability threshold. In other embodiments, the statement 110 can be attributed to the source with the most probable reference model even if its associated probability is not above the threshold. The model database 115 can also be updated so that reference model of a source selected for attribution can further define the statement 110 model. This is discussed in greater detail with respect to FIG. 2.

Further, the attribution selector 150 can generate an output (not shown) that provides information about potential sources of the statement 110, such as the name of the most probable source. This can include a message that can be viewed by a user. In some embodiments, the message is generated in response to a user query. However, the message can also be automatically displayed via an automatic notification (e.g., a pop-up notification) or an annotation near the statement 110 (e.g., in a text box) on a user interface. The message can specify a source selected by the attribution selector 150 and/or probabilities associated with one or more potential sources. If the statement 110 has an initial attribution, the message can indicate whether or not the initial attribution is accurate (e.g., via a yes or no answer in response to a user query, an annotation indicating that the attribution is unconfirmed and/or likely to have been misattributed, etc.).

Figure 2:
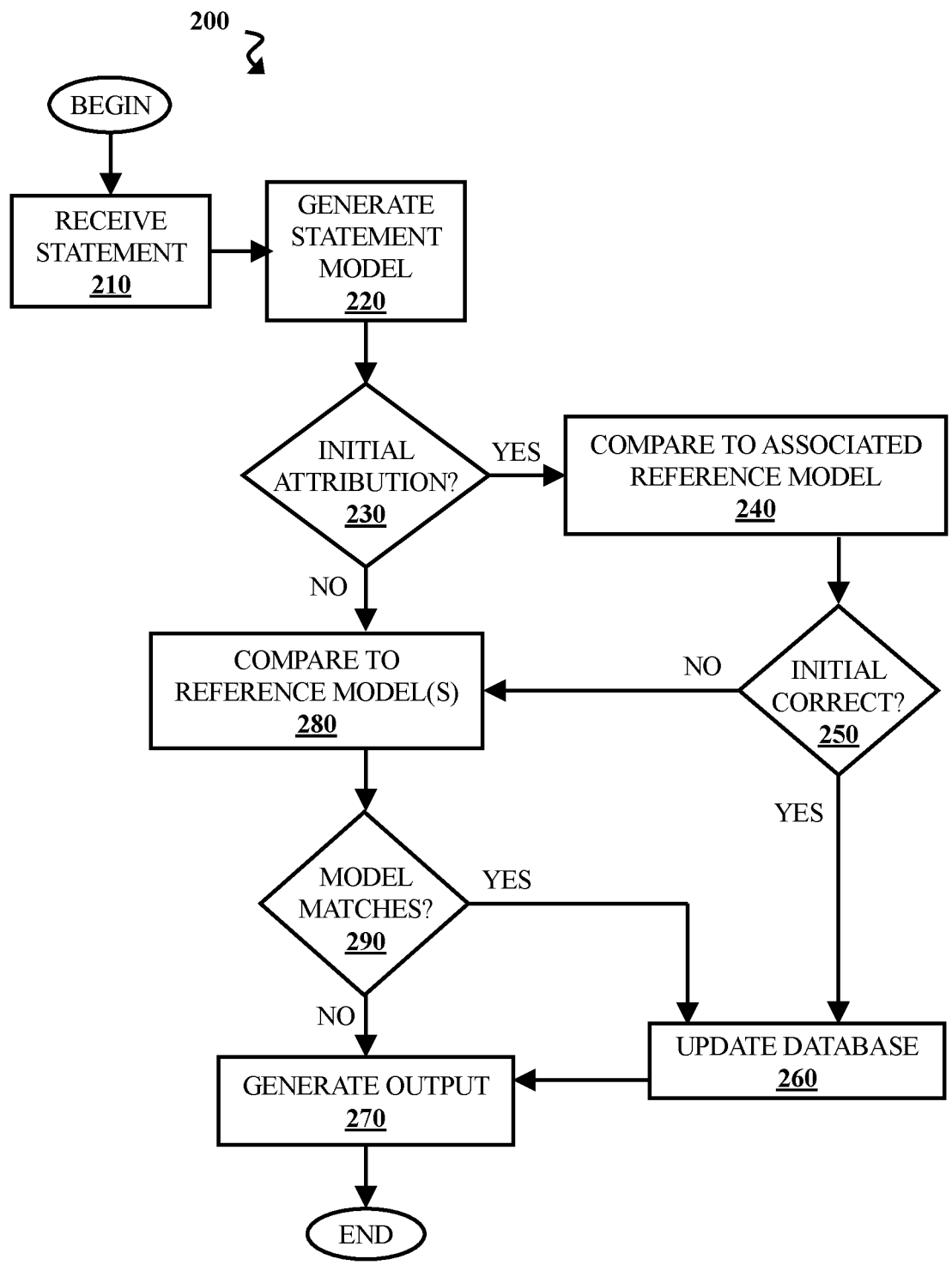
FIG. 2 is a flow diagram illustrating a process of identifying probable sources of a statement, according to some embodiments of the present disclosure.

FIG. 2 is a flow diagram illustrating a process 200 of identifying probable sources of a statement, according to some embodiments of the present disclosure. To illustrate process 200, but not to limit embodiments, FIG. 2 is described within the context of the attribution analysis environment 100 of FIG. 1. Where elements shown in FIG. 2 are identical to elements shown in FIG. 1, the same reference numbers are used in both Figures.

The statement 110 is received by the statement analysis module 120. This is illustrated at step 210. The statement 110 is an utterance (e.g., at least one phrase) in the form of computer-readable text data. The statement 110 can be entered by a user. The statement 110 can also be automatically extracted by the feature extractor 130 according to preset instructions. For example, a news website can have statement attributions automatically analyzed for accuracy via the statement analysis module 120. In some embodiments, the statement 110 can have an initial attribution. The statement 110 can also be from an unknown source.

A model based on the statement 110 is then generated. This is illustrated at step 220. This statement 110 model is generated by the model generator 140 based on natural language patterns, which can be generated manually and/or by the feature extractor 130. The patterns are based on grammatical features of the statement 110. In addition to the patterns, the model generator 140 can use various additional features, which can be entered manually or extracted by the feature extractor 130, to build the model. Examples of patterns and features are discussed in greater detail with respect to FIG. 1.

It is then determined whether the statement 110 has an initial attribution. This is illustrated at step 230. The initial attribution can be user-entered or obtained automatically. If there is an initial attribution, the statement 110 model is compared to a reference model associated with the initial attribution source. This is illustrated at step 240. The associated reference model is based on previous statements from the source to which the statement 110 was initially attributed. For example, if the statement 110 is initially attributed to a known individual, the statement 110 model can be compared to a reference model that is based on statements known to have been made by this individual.

The attribution selector 150 compares the models using at least one distance metric, such as Squared Difference Sum. Other techniques for measuring similarity that can be used can include artificial neural networks, convolutional neural networks, pre-trained recurrent neural network (RNN) classifiers, supervised machine learning algorithms, semi-supervised machine learning algorithms, unsupervised machine learning algorithms, cross correlation, Hidden Markov Models (HMMs), etc. The attribution selector 150 can also determine the probability of the source associated with the reference model being the source of the statement 110.

It is then determined whether the initial attribution is correct. This is illustrated at step 250. In some embodiments, the attribution selector 150 determines whether the similarity between the associated reference model and the statement 110 model is above a threshold similarity. The attribution selector 150 can further determine a probability of the initial attribution being correct, and whether the probability is above a threshold probability. If the similarity and/or probability values determined by the attribution selector 150 are at or above their respective threshold values, the initial attribution is determined to be correct. However, if the similarity and/or probability values are below these thresholds, the initial attribution is determined to be incorrect.

If the initial attribution is determined to be correct at step 250, the attribution selector 150 attributes the statement to the source associated with the initial attribution, and updates the database. This is illustrated at step 260. In this step, the reference model associated with the selected source is updated to include patterns and other features extracted from the statement 110 at step 220. The updated reference model is then stored in the model database 115. This can increase the accuracy of matching the reference model to new statement models generated in instances where process 200 is repeated.

An output 270 that identifies the attribution is then generated. This is illustrated at step 270. While step 270 is illustrated as occurring after the database update of step 260, steps 270 and 260 can also occur in the opposite order or simultaneously. It should also be noted that step 260 can be omitted in some embodiments, in which case process 200 can instead proceed directly from step 250 to step 270. The output (e.g., a message, notification, annotation, etc.) can indicate that initial attribution is correct. Examples of outputs that can be generated by the attribution selector 150 are discussed in greater detail with respect to FIG. 1. When the output has been generated, process 200 can end. Process 200 can also be repeated if new statements are received.

If the initial attribution is determined to be incorrect at step 250, or if there is no initial attribution found at step 230, the statement 110 model is compared to one or more reference models in the model database 115. This is illustrated at step 280. The statement 110 model is compared to the set of one or more reference models in order to determine whether there is at least one probable source of the statement 110. These reference models can be generated by the model generator 140. The comparison between the statement 110 model and each reference model in the set is carried out using substantially similar techniques to those discussed above with respect to step 240. However, it should be noted that in some embodiments process 200 can proceed directly from step 250 to 270 when the initial attribution is determined to be incorrect at step 250. This can be in response to user-input or preset instructions. In these instances, an output can be generated to indicate that the initial attribution is incorrect, and does not provide an accurate source for the statement 110. Process 200 can then end, or be repeated for a new statement.

Based on the model comparisons at step 280, it determined whether there is at least one probable source of the statement 110 associated with a reference model. This is illustrated at step 290. The probable source can be associated with a reference model that has the greatest similarity to the statement 110 model. In some embodiments, a probable source must be associated with a reference model having a similarity value greater than a similarity threshold. Similarly, a probable source may be required to have a probability of being the source of the statement 110 above a probability threshold. In some embodiments, more than one source can be associated with a probability that is above the threshold probability, and the most probable or similar of these sources can be automatically selected by the attribution selector 150. In other embodiments, a source can be selected without comparison to a threshold value.

If there is a probable source of the statement 110 selected by the attribution selector 150, process 200 can proceed to steps 260 and 270 to update the model database 115 so that the reference model associated with selected source further defines the statement 110 model, and to generate an output attributing the statement 110 to the source. In some embodiments, the database update at step 260 is omitted. Steps 260 and 270 are discussed in greater detail above.

Further, if a probable source is not found and selected for attribution at step 290, process 200 proceeds to step 270, wherein an output is generated. In these instances, the output can indicate that no attribution could be made. The output can also indicate that there is more than one potential source of the statement 110. For example, if there is more than one reference model with a similarity/probability above a threshold value at step 290, the sources associated with these reference models can be identified by the output. The output can also rank the potential sources based on probability of being the statement 110 source. When the output has been generated at step 270, process 200 can end, or be repeated for a new statement. However, in some embodiments (not shown) a user can optionally select a source from the potential sources identified by the output. The user may also enter this selection via the user interface, whereupon the database 115 can be updated to include the reference model associated with the user-selected source (step 260).

Figure 3:
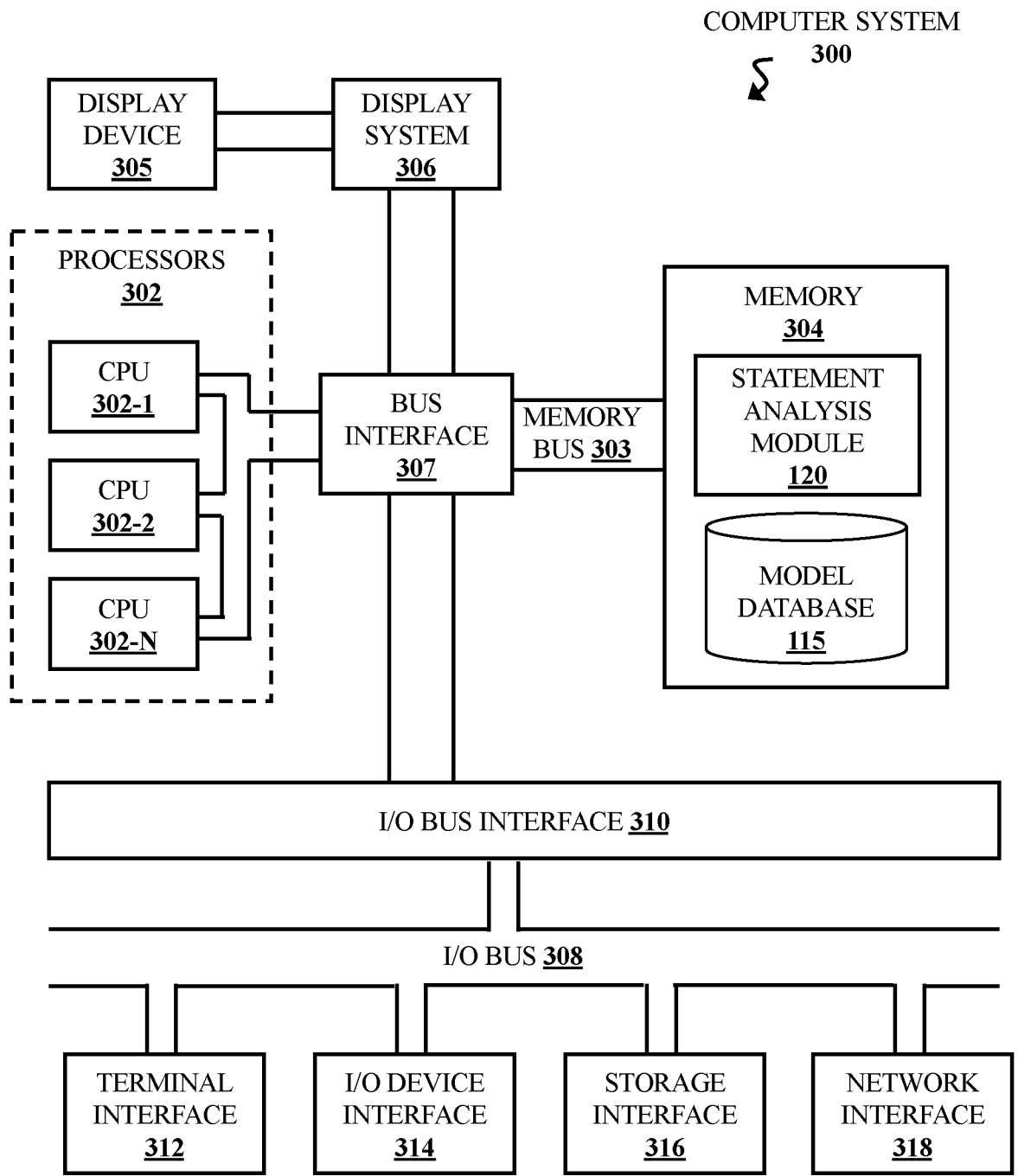
FIG. 3 is a block diagram illustrating a computer system, according to some embodiments of the present disclosure.

FIG. 3 is a block diagram illustrating an exemplary computer system 300 that can be used in implementing one or more of the methods, tools, components, and any related functions described herein (e.g., using one or more processor circuits or computer processors of the computer). In some embodiments, the major components of the computer system 300 comprise one or more processors 302, a memory subsystem 304, a terminal interface 312, a storage interface 316, an input/output device interface 314, and a network interface 318, all of which can be communicatively coupled, directly or indirectly, for inter-component communication via a memory bus 303, an input/output bus 308, bus interface unit 307, and an input/output bus interface unit 310.

The computer system 300 contains one or more general-purpose programmable central processing units (CPUs) 302-1, 302-2, and 302-N, herein collectively referred to as the CPU 302. In some embodiments, the computer system 300 contains multiple processors typical of a relatively large system; however, in other embodiments the computer system 300 can alternatively be a single CPU system. Each CPU 302 may execute instructions stored in the memory subsystem 304 and can include one or more levels of on-board cache.

The memory 304 can include a random-access semiconductor memory, storage device, or storage medium (either volatile or non-volatile) for storing or encoding data and programs. In some embodiments, the memory 304 represents the entire virtual memory of the computer system 300, and may also include the virtual memory of other computer systems coupled to the computer system 300 or connected via a network. The memory 304 is conceptually a single monolithic entity, but in other embodiments the memory 304 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory can be further distributed and associated with different CPUs or sets of CPUs, as is known in any of various so-called non-uniform memory access (NUMA) computer architectures. The memory 304 also contains a statement analysis component 120 and a model database 115 (illustrated in FIG. 1).

These components are illustrated as being included within the memory 304 in the computer system 300. However, in other embodiments, some or all of these components may be on different computer systems and may be accessed remotely, e.g., via a network. The computer system 300 may use virtual addressing mechanisms that allow the programs of the computer system 300 to behave as if they only have access to a large, single storage entity instead of access to multiple, smaller storage entities. Thus, though the statement analysis component 120 and the model database 115 are illustrated as being included within the memory 304, components of the memory 304 are not necessarily all completely contained in the same storage device at the same time. Further, although these components are illustrated as being separate entities, in other embodiments some of these components, portions of some of these components, or all of these components may be packaged together.

In an embodiment, the statement analysis component 120 and the model database 115 include instructions that execute on the processor 302 or instructions that are interpreted by instructions that execute on the processor 302 to carry out the functions as further described in this disclosure. In another embodiment, the statement analysis component 120 and the model database 115 are implemented in hardware via semiconductor devices, chips, logical gates, circuits, circuit cards, and/or other physical hardware devices in lieu of, or in addition to, a processor-based system. In another embodiment, the statement analysis component 120 and the model database 115 include data in addition to instructions.

Although the memory bus 303 is shown in FIG. 3 as a single bus structure providing a direct communication path among the CPUs 302, the memory subsystem 304, the display system 306, the bus interface 307, and the input/output bus interface 310, the memory bus 303 can, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the input/output bus interface 310 and the input/output bus 308 are shown as single respective units, the computer system 300 may, in some embodiments, contain multiple input/output bus interface units 310, multiple input/output buses 308, or both. Further, while multiple input/output interface units are shown, which separate the input/output bus 308 from various communications paths running to the various input/output devices, in other embodiments some or all of the input/output devices may be connected directly to one or more system input/output buses.

The computer system 300 may include a bus interface unit 307 to handle communications among the processor 302, the memory 304, a display system 306, and the input/output bus interface unit 310. The input/output bus interface unit 310 may be coupled with the input/output bus 308 for transferring data to and from the various input/output units. The input/output bus interface unit 310 communicates with multiple input/output interface units 312, 314, 316, and 318, which are also known as input/output processors (IOPs) or input/output adapters (IOAs), through the input/output bus 308. The display system 306 may include a display controller. The display controller may provide visual, audio, or both types of data to a display device 305. The display system 306 may be coupled with a display device 305, such as a standalone display screen, computer monitor, television, or a tablet or handheld device display. In alternate embodiments, one or more of the functions provided by the display system 306 may be on board a processor 302 integrated circuit. In addition, one or more of the functions provided by the bus interface unit 307 may be on board a processor 302 integrated circuit.

In some embodiments, the computer system 300 is a multi-user mainframe computer system, a single-user system, or a server computer or similar device that has little or no direct user interface, but receives requests from other computer systems (clients). Further, in some embodiments, the computer system 300 is implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 300. In some embodiments, however, individual components may have greater or lesser complexity than as represented in FIG. 3, Components other than or in addition to those shown in FIG. 3 may be present, and the number, type, and configuration of such components may vary.

In some embodiments, the data storage and retrieval processes described herein could be implemented in a cloud computing environment, which is described below with respect to FIGS. 4 and 5. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
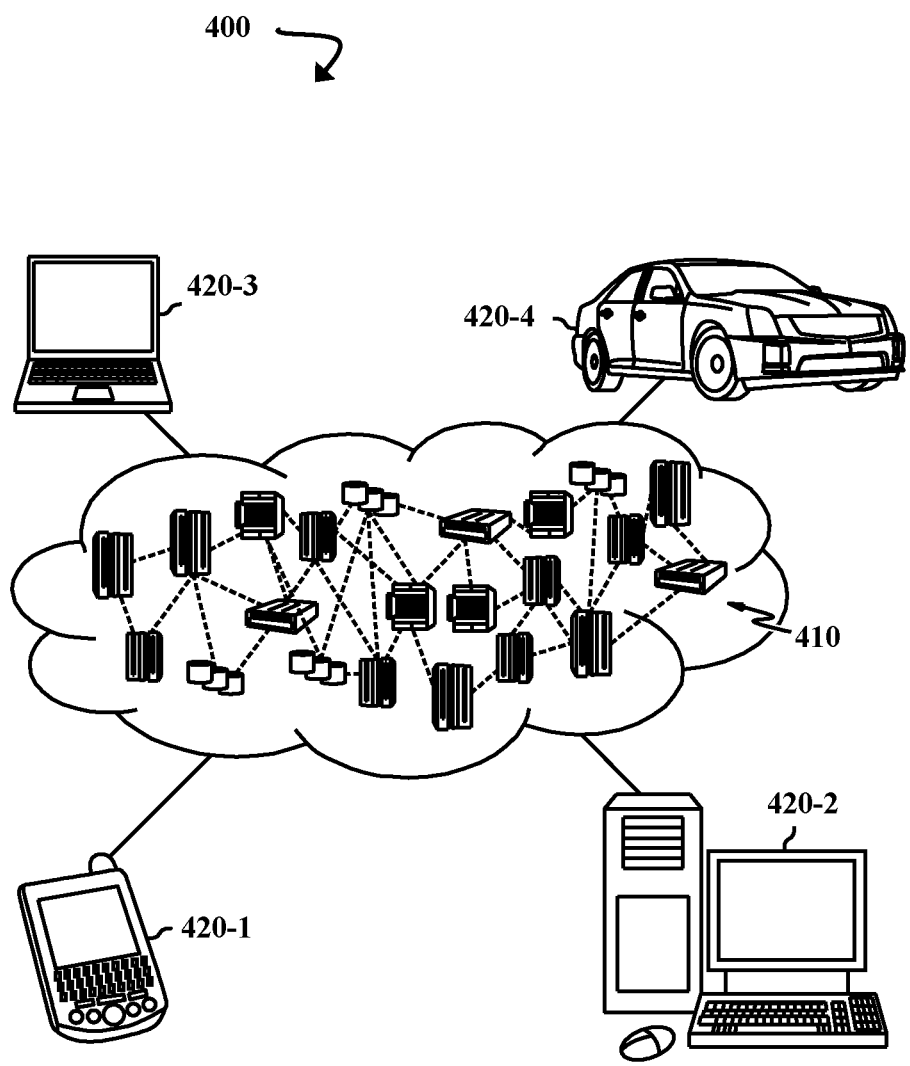
FIG. 4 is a block diagram illustrating a cloud computing environment, according to some embodiments of the present disclosure.

FIG. 4 is a block diagram illustrating a cloud computing environment 400, according to some embodiments of the present disclosure. As shown, cloud computing environment 400 includes one or more cloud computing nodes 410 with which local computing devices used by cloud consumers, such as, for example, personal digital assistant (PDA) or cellular telephone 420-1, desktop computer 420-2, laptop computer 420-3, and/or automobile computer system 420-4 may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 420-1-420-4 shown in FIG. 4 are intended to be illustrative only and that computing nodes 410 and cloud computing environment 400 can communicate with any type of computerized device over any type of network and/or network addressable connection (e.g., using a web browser).

Figure 5:
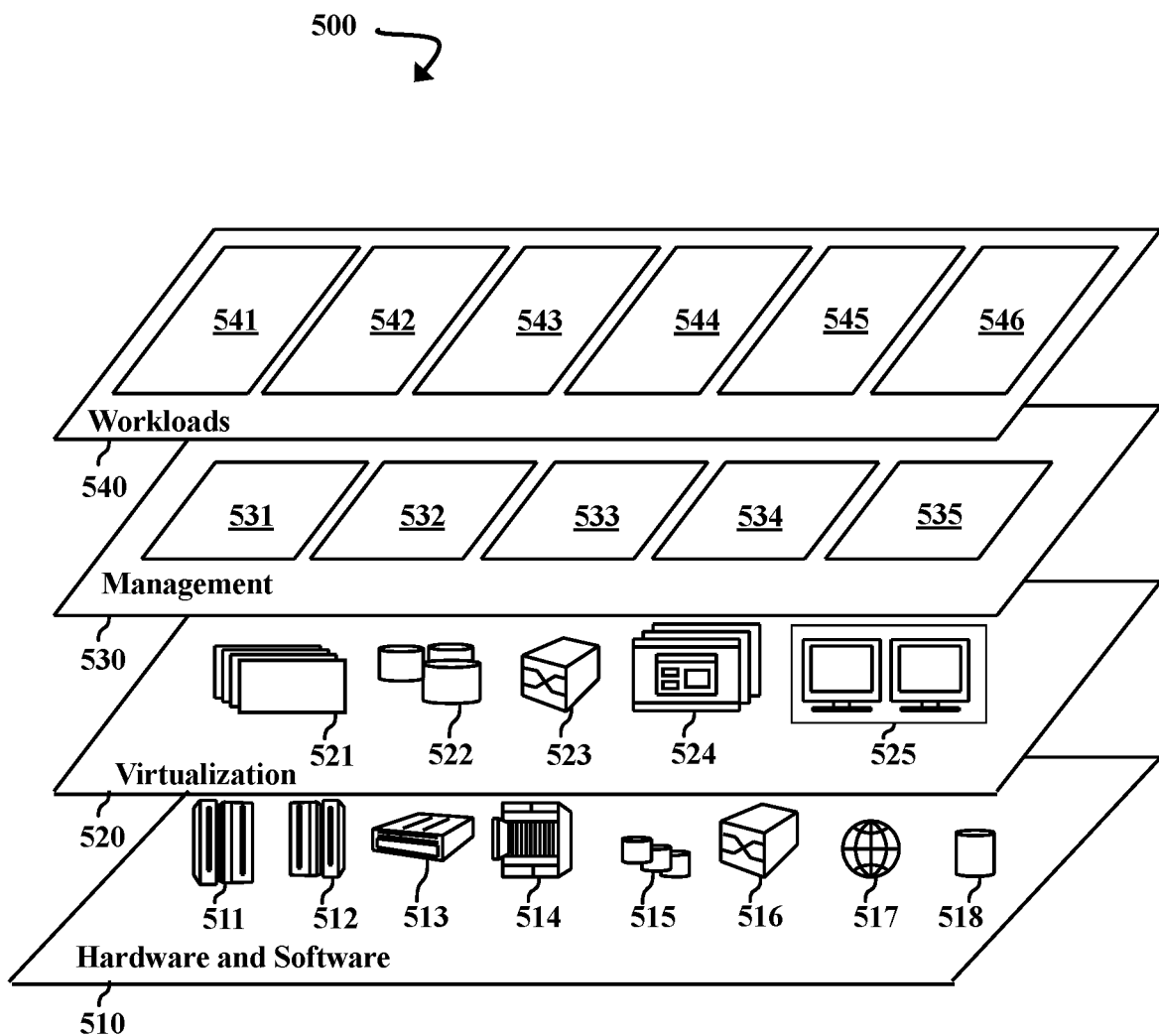
FIG. 5 is a block diagram illustrating a set of functional abstraction model layers provided by the cloud computing environment, according to some embodiments of the present disclosure.

FIG. 5 is a block diagram illustrating a set of functional abstraction model layers 500 provided by the cloud computing environment 400, according to some embodiments of the present disclosure. It should be understood in advance that the components, layers, and functions shown in FIG. 5 are intended to be illustrative only and embodiments of the invention are not limited thereto. As depicted, the following layers and corresponding functions are provided:

Hardware and software layer 510 includes hardware and software components. Examples of hardware components include: mainframes 511; RISC (Reduced Instruction Set Computer) architecture-based servers 512; servers 513; blade servers 514; storage devices 515; and networks and networking components 516. In some embodiments, software components include network application server software 517 and database software 518.

Virtualization layer 520 provides an abstraction layer from which the following examples of virtual entities may be provided: virtual servers 521; virtual storage 522; virtual networks 523, including virtual private networks; virtual applications and operating systems 524; and virtual clients 525.

In one example, management layer 530 provides the functions described below. Resource provisioning 531 provides dynamic procurement of computing resources and other resources that are utilized to perform tasks within the cloud computing environment. Metering and Pricing 532 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 533 provides access to the cloud computing environment for consumers and system administrators. Service level management 534 provides cloud computing resource allocation and management such that required service levels are met. Service Level Agreement (SLA) planning and fulfillment 535 provide pre-arrangement for, and procurement of, cloud computing resources for which a future requirement is anticipated in accordance with an SLA.

Workloads layer 540 provides examples of functionality for which the cloud computing environment can be utilized. Examples of workloads and functions that can be provided from this layer include: mapping and navigation 541; software development and lifecycle management 542; virtual classroom education delivery 543; data analytics processing 544; transaction processing 545; and determining statement attributions 546.

The present disclosure may be a system, a method, and/or a computer program product. The computer program product may include a computer readable storage medium (or media) having computer readable program instructions thereon for causing a processor to carry out aspects of the present disclosure.

The computer readable storage medium is a tangible device that can retain and store instructions for use by an instruction execution device. Examples of computer readable storage media can include an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a component, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alternations and modification thereof will become apparent to the skilled in the art. Therefore, it is intended that the following claims be interpreted as covering all such alternations and modifications as fall within the true spirit and scope of the present disclosure.

What is claimed is:

1. A system, comprising:
   a memory; and
   a processor communicatively coupled to the memory, wherein the processor is configured to:
   receive a statement attributed to a known source, the statement comprising semantic, lexical, and grammatical features;
   generate at least one pattern defining the grammatical features of the statement;
   generate a language-independent statement model from the at least one pattern;
   determine a similarity value for the language-independent statement model and a language-independent reference model associated with the known source;
   compare the similarity value to a threshold similarity value; and
   generate, based on the comparison to the threshold similarity value, an output indicating whether the attribution is correct or incorrect.

2. The system of claim 1, wherein the language-independent reference model is based on at least one existing statement uttered by the known source.

3. The system of claim 1, further comprising a model database, wherein the model database comprises the language-independent reference model and additional reference models having associated sources.

4. The system of claim 3, wherein the processor is further configured to:
   determine additional similarity values for the language-independent statement model and the additional reference models;
   identify, based on the similarity value and the additional similarity values, a source from the associated sources that has the highest probability of being a source of the statement;
   attribute the statement to the identified source; and
   generate an output that displays the attribution.

5. The system of claim 1, wherein the processor is further configured to:
   determine that the similarity value is above the threshold similarity value; and
   in response to the determination, generate an output indicating that the attribution of the statement to the known source is correct.

6. The system of claim 1, wherein the processor is further configured to:
   determine that the similarity value is below the threshold similarity value; and
   in response to the determination, generate an output indicating that the attribution of the statement to the known source is incorrect.

7. The system of claim 1, wherein the at least one pattern is a language-independent dependency tree.

8. A method, comprising:
   receiving a statement attributed to a known source, the statement comprising semantic, lexical, and grammatical features;
   generating at least one pattern defining the grammatical features of the statement;
   generating a language-independent-statement model from the at least one pattern;
   determining a similarity value for the language-independent statement model and a language-independent reference model associated with the known source;
   comparing the similarity value to a threshold similarity value; and generating, based on the comparison to the threshold similarity value, an output indicating whether the attribution is correct or incorrect.

9. The method of claim 8, wherein the language-independent reference model is based on at least one existing statement uttered by the known source.

10. The method of claim 8, further comprising determining additional similarity values for the language-independent statement model and additional reference models having associated sources.

11. The method of claim 10, further comprising:
identifying, based on the similarity value and the additional similarity values, a source from the associated sources that has the highest probability of being a source of the statement;
attributing the statement to the identified source; and
generating an output that displays the attribution.

12. The method of claim 8, further comprising:
determining that the similarity value is above the threshold similarity value; and
in response to the determining, generating an output indicating that the attribution of the statement to the known source is correct.

13. The method of claim 8, further comprising:
determining that the similarity value is below the threshold similarity value; and
in response to the determining, generating an output indicating that the attribution of the statement to the known source is incorrect.

14. The method of claim 8, wherein the at least one pattern is a language-independent dependency tree.

15. A computer program product for determining attributions, the computer program product comprising a computer readable storage medium having program instructions embodied therewith, the program instructions executable by a processor to cause the processor to perform a method, the method comprising:
receiving a statement attributed to a known source, the statement comprising semantic, lexical, and grammatical features;
generating at least one pattern defining the grammatical features of the statement;
generating a language-independent statement model from the at least one pattern;
determining a similarity value for the language-independent statement model and a language-independent reference model associated with the known source;
comparing the similarity value to a threshold similarity value; and
generating, based on the comparison to the threshold similarity value, an output indicating whether the attribution is correct or incorrect.

16. The computer program product of claim 15, wherein the at least one pattern is a language-independent dependency tree.

17. The method of claim 8, further comprising:
determining that the similarity value is below the threshold similarity value; and
in response to the determining, determining a second similarity value for the statement model and a reference model associated with a second known source.

18. The method of claim 8, further comprising:
receiving statements uttered by the known source, the statements comprising semantic, lexical, and grammatical features;
generating patterns defining the grammatical features of the statements; and
generating the language-independent reference model associated with the known source from the patterns defining the grammatical features of the statements.

19. The method of claim 18, further comprising storing the language-independent reference model in a model database.

20. The method of claim 8, further comprising:
in response to the receiving the statement, locating statements uttered by the known source, the statements comprising semantic, lexical, and grammatical features;
generating patterns defining the grammatical features of the statements; and
generating the language-independent reference model associated with the known source from the patterns defining the grammatical features of the statements.

* * * * *